US008636426B2

(12) United States Patent
Lin et al.

(10) Patent No.: US 8,636,426 B2
(45) Date of Patent: Jan. 28, 2014

(54) PHOTOELECTRIC CONVERSION SYSTEM WITH OPTICAL TRANSCEIVE MODULE

(75) Inventors: Eric Lin, Lake Forest, CA (US); Jim Zhao, Irvine, CA (US); Jia-Hau Liu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 384 days.

(21) Appl. No.: 13/180,435

(22) Filed: Jul. 11, 2011

(65) Prior Publication Data

US 2013/0016981 A1 Jan. 17, 2013

(51) Int. Cl.
*G02B 6/36* (2006.01)
(52) U.S. Cl.
USPC ............... 385/89; 385/14; 385/53; 385/88
(58) Field of Classification Search
USPC .......................................... 385/14, 53, 88, 89
See application file for complete search history.

(56) References Cited

U.S. PATENT DOCUMENTS

| 6,229,712 B1* | 5/2001 | Munoz-Bustamante et al. ............................ 361/783 |
| 6,554,495 B1* | 4/2003 | Zhu et al. ........................ 385/92 |
| 7,455,463 B2 | 11/2008 | Togami et al. |
| 2003/0198439 A1* | 10/2003 | Hiramatsu ...................... 385/39 |

* cited by examiner

*Primary Examiner* — Jennifer Doan
(74) *Attorney, Agent, or Firm* — Wei Te Chung; Ming Chieh Chang

(57) ABSTRACT

An optical coupling device includes a substrate loaded with a first optical module and IC drivers, and a second optical module intending to couple with the first optical module. The substrate defines an electrical connection port at one end thereof, the first optical module is located at another end of the substrate. The second optical module includes a first insulating holder and fiber cores embedded in the insulating holder. The first optical module includes a second insulating holders and VCSELS and PDS embedded with the second insulating holder, the fiber cores are directly coupled with VCSELS and PDS to transmit light lines therein.

14 Claims, 5 Drawing Sheets

PHOTOELECTRIC CONVERSION SYSTEM WITH OPTICAL TRANSCEIVE MODULE

BACKGROUND OF THE INVENTION

1. Field of the Invention

The present invention is generally related to a photoelectric conversion system used in optic communications systems. More particularly, the present invention provides for optical transceiver modules.

2. Description of Related Arts

Fiber optic technology is increasingly employed as a method by which information can be reliably transmitted via a communications network. Networks employing fiber optic technology are known as optical communications networks, and are marked by high bandwidth and reliable, high-speed data transmission.

U.S. Pat. No. 7,455,463 illustrates an example view of various transceivers positioned on a substrate which is loaded in high speed connection device such as a Small Form Factor Pluggable ("SFP") connector. The substrate has a conductive end with a plurality of conductive pads functioned as an electrical port. One transceiver is located at another end of the substrate, which includes a transmitting optical subassembly ("TOSA") and a receiving optical subassembly ("ROSA"). Typically, each OSA is created as a separate physical entity, such as a hermetically sealed cylinder that includes one or more optical sending or receiving components, as well as electrical circuitry for handling and converting between optical and electrical signals. Within the optical transceiver, each OSA generally includes electrical connections to various additional components such as a transceiver substrate, sometimes embodied in the form of a printed circuit board ("PCB").

Each of the TOSA and ROSA is good for only one fiber and the TOSA and ROSA are separate pieces from each other which still occupy a larger space on the substrate and space in the high speed connection device. One lens block with lens pin is assembled at a front of each of TOSA and ROSA to complete light lines transmission.

SUMMARY OF THE INVENTION

An optical coupling device comprises a substrate loaded with a first optical module and IC drivers, and a second optical module intending to couple with the first optical module. The substrate defines an electrical connection port at one end thereof, the first optical module is located at another end of the substrate. The second optical module comprises a first insulating holder and core fibers embedded in the insulating holder. The first optical module comprise a second insulating holders and VCSELS and PDS embedded with the second insulating holder, the core fibers are directly coupled with VCSELS and PDS to transmit light lines therein.

Other features and advantages of the present invention will become more apparent to those skilled in the art upon examination of the following drawings and detailed description of preferred embodiments, in which:

DETAILED DESCRIPTION OF THE PREFERRED EMBODIMENT

Further detailed description of the preferred embodiments of this present invention is set forth below along with the attached drawings.

Figure 1:
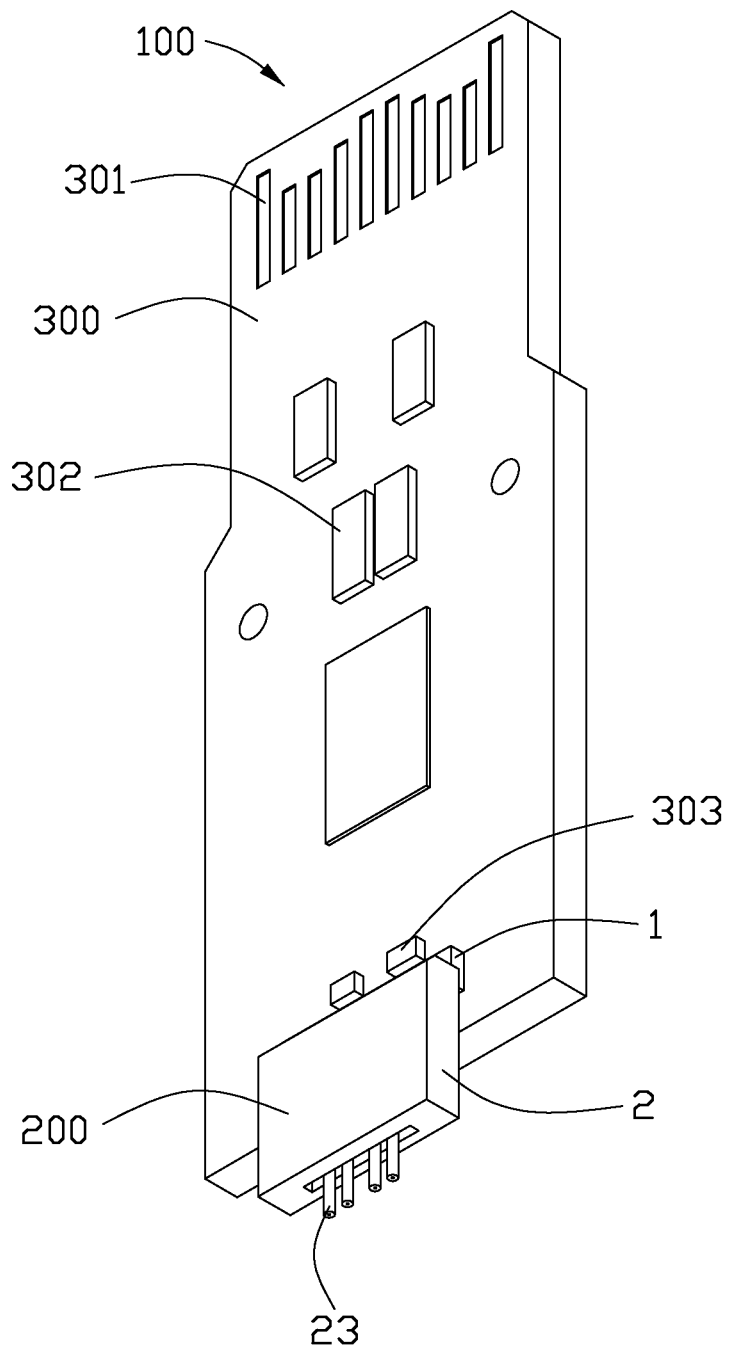
FIG. 1 is a perspective view of a photoelectric conversion system in accordance with a first embodiment of the present invention.

FIG. 1 shows a photoelectric conversion system 100 of an embodiment of the present invention, which includes a transceiver module 200 and a substrate 300 which is similar to said prior art and will not depict. The substrate 300 is loaded with a plurality of conductive pads 301 at a first end thereof to provide an electrical port and a plurality of electronic elements 302 such as capacitance and IC drivers 303. The transceiver module 200 includes a first optical module 1 located at a second end of the substrate 300 and a second optical module 2 which is intended to couple with the first optical module 1 for completing optical transmission. The second optical module is connecting with optical fiber cables 23.

Figure 2:
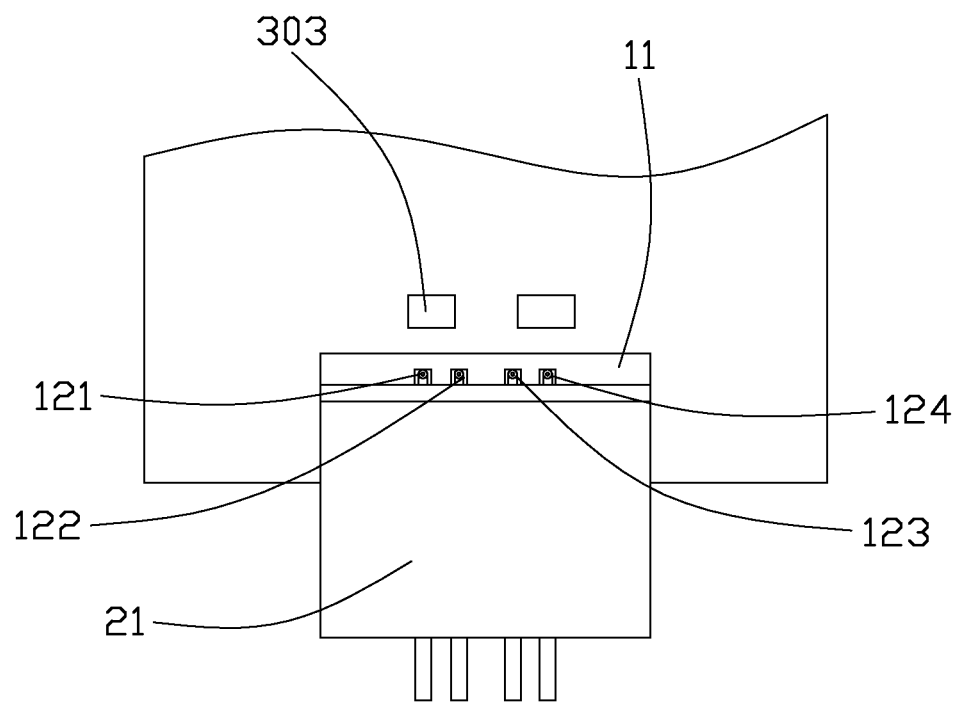
FIG. 2 is a top planar view of parts of the photoelectric conversion system shown in FIG. 1.

Referring now to FIG. 2, each optical module is integrated within a relatively small physical holder 11/21, the first optical module includes a VCSEL (vertical cavity surface emitting laser) pair 121, 122 and a PD (photodiode) pair 1231 124, the VCSELS are used to convert electrical signal to optical signal for transmission signal and the PDS are used to convert optical signal to electrical signal for receiving signal. The ICs drivers 303 respectively are used for starting the VCSELS and the PDS. The holders are made from insulating material.

Figure 3:
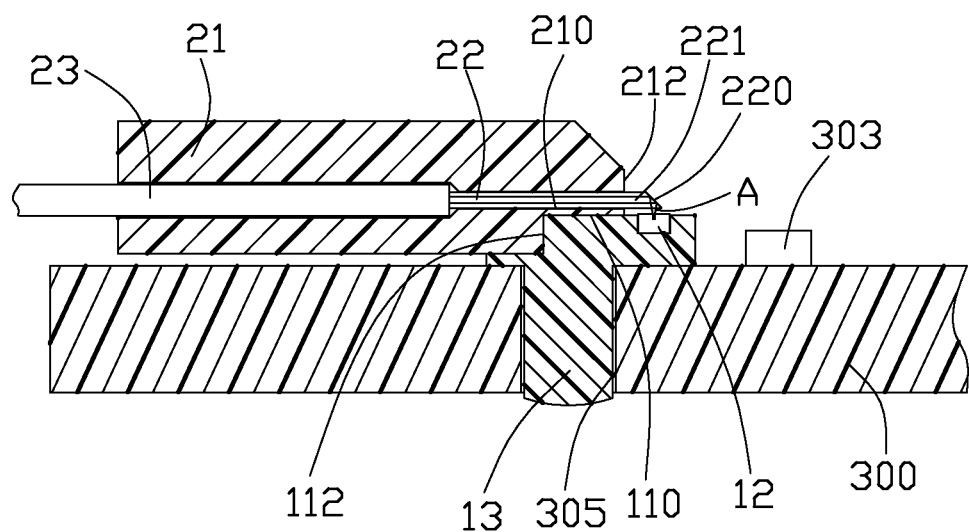
FIG. 3 is a schematic cross-sectional view of the photoelectric conversion system.

Combination with FIG. 3, the insulating holder 11 of the first optical module 1 is of a rectangular shape, which defines a coupling surface 110 oppose to the substrate 300 and a step engaging surface 112 at a rear end thereof. The VCSELS and the PDS are in a pad shape (i.e. converting pads 12) and embedded in the insulating holder 11. The converting pads 12 expose to the coupling surface 110. The holder 11 further includes a pair of positioning posts 13 projecting downwards from an opposite surface to the coupling surface 110 to be inserted in through holes 305 defined in the substrate, thereby the holder being fitly mounted on the substrate 300.

The holder 21 of the second optical module 2 is of a rectangular shape, which defines a coupling surface intending to confront with the coupling surface 110 of the first optical module 1. The optical fiber cores (which might be waveguide) 22 are embedded in the holder and connecting to optical fiber cables 23 extending rearwards. The fiber cores extend forward out of a vertical surface 212 of the holder 21 to form an optical coupling portion 221 which has a slantwise reflecting surface 220 at a free end thereof to reflect light lines in the fiber cores 22 to the coupling surface 110 to complete transmission. The slantwise reflecting surface 220 is formed by laser cleave.

In this embodiment of the present invention, the VCSELS and the PDS are embedded in the insulating holder, so it is not limited to a single fiber, waveguide or channel but good for multiple fibers, thereby it is flexible to expand for multichannel application. The VCSELS and the PDS are made in one piece with a low profile so as to smaller size, it is flexible to accommodate various form factors. At a same time, it is a very simple design which may have low cost manufacturing and mass production is very likely. Since the light lines transmit by reflection at the optical couple portion 220 which is different from lens focus of the conventional art, it is provide a chance to use an index matching gel, which can be applied and cured permanently to minimize the reflection effect in this present invention, while the TOSA and ROSA ion prior arts are designed to accept external fiber cables.

Figure 4:
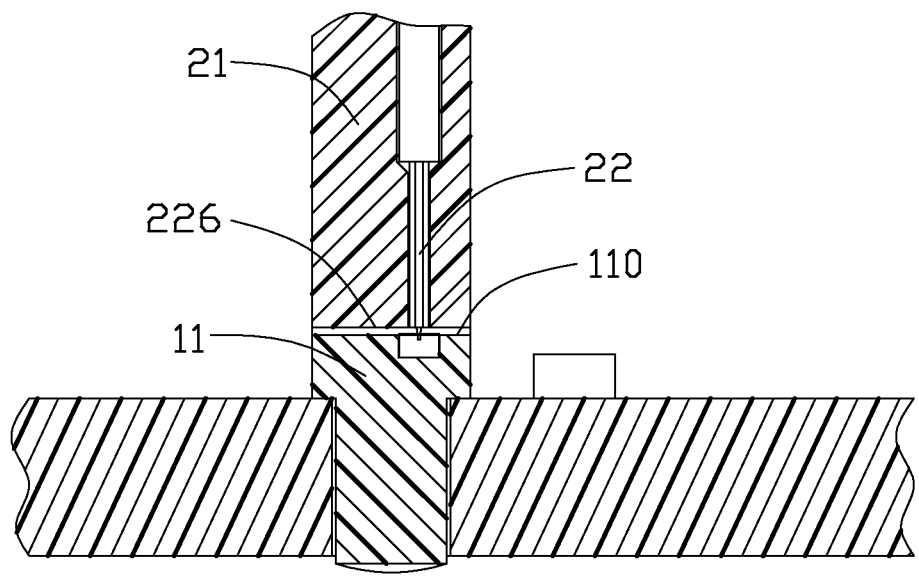
FIG. 4 is a schematic cross-sectional view of a photoelectric conversion system in accordance with a second embodiment of the present invention.
Figure 5:
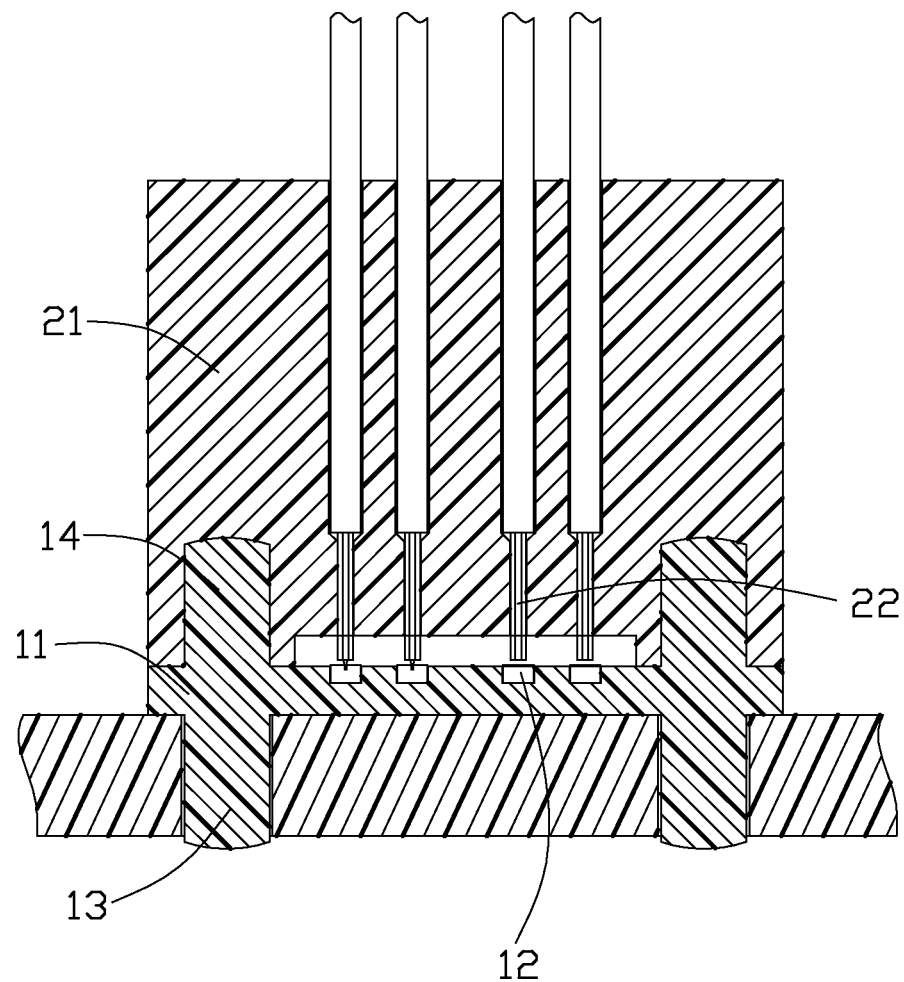
FIG. 5 is a top planar view of parts of the photoelectric conversion system of the second embodiment.

FIGS. 4 and 5 show a second embodiment of the present invention which is vertical alignment of the first and second optical modules, while said first embodiment is horizontal alignment of the first end the second optical modules. The fiber cores 22 downwards to expose a coupling surface 226 which confront with corresponding coupling surface 110 of the holder 11 of the first optical module, so that the free ends of the core fibers are aligned with and coupled with the converting pads, i.e., the VCSELS and PDS. The first insulating holder 11 further includes a pair of guiding posts 14 opposite to the positioning posts 13, which are inserted into holes defines in the second insulating holder 21 to ensure an alignment of said first and second insulating holders.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A photoelectric conversion system comprising:
   a substrate loaded with a first optical module and IC drivers, the substrate defining an electrical connection port at one end thereof, the first optical module being located at another end of the substrate;
   a second optical module intending to couple with the first optical module and comprising a second insulating holder and fiber cores embedded in the second insulating holder;
   wherein the first optical module comprise a first insulating holders and VCSELS and PDS embedded with the first insulating holder, the fiber cores are directly coupled with VCSELS and PDS to transmit light lines therein.

2. The photoelectric conversion system as described in claim 1, wherein the first insulating holder defines a first coupling surface opposite to the substrate and the VCSELS and PDS are shaped in pads respectively exposing to the first coupling surface.

3. The photoelectric conversion system as described in claim 2, wherein the second insulating holder defines a second coupling surface confronting with the first coupling surface and a front end face non-parallel to the second coupling surface, the fiber cores extend out of the front end face to form a coupling portion, the coupling portion has a slanting reflecting surface to reflect the light lines to the VCSELS and PDS.

4. The photoelectric conversion system as described in claim 3, wherein fiber cores of the second optical module connect with optical fiber cables at a rear end of the second insulating holder.

5. The photoelectric conversion system as described in claim 4, wherein the first optical module defines a pair of positioning posts projecting from a bottom of the second insulting holder to be inserted in through holes defined in the substrate.

6. A transceiver module comprising:
   a first optical module comprising a first insulating holder and converting pads embedded in the first insulating holder, the first insulating holder defining a first coupling surface and the converting pads exposing to the first coupling surface;
   a second optical module intending to couple with the first optical module at the first coupling surface and comprising a second insulating holder and fiber cores embedded in the second insulating holder, the fiber cores exposing to the second insulating holder extending out of the insulating holder;
   wherein light lines transmitting from the fiber cores are directly aligned with and into the converting pads.

7. The transceiver module as described in claim 6, wherein the converting pads are lined in the second insulating holder.

8. The transceiver module as described in claim 7, wherein the second insulating holder defines a second coupling surface confronting with the first coupling surface, the fiber cores of the second optical module project out of the second insulating housing and define a slant reflecting surface to reflect light lines in the fiber cores perpendicular through to the second coupling surface.

9. The transceiver module as described in claim 7, wherein the second insulating holder defines a second coupling surface confronting with the first coupling surface, the fiber cores of the second optical module expose to the second coupling surface and are aligned with the converting pads correspondingly so that light lines in the core fibers go through the second coupling surface into the converting pads.

10. An optical transceiver module comprising:
    a printed circuit board defining an electrical area and an optical area;
    a first optical module and a second optical module located in the optical area,
    the first optical module including a first insulative holder and the second optical module including a second insulative holder associated with the first insulative holder under condition that a portion of the first insulative holder embedded within the printed circuit board; and
    a plurality of optical fibers extending through the second insulative holder with tips in alignment, in a vertical direction perpendicular to the printed circuit board, with corresponding converting pads which are embedded within the first insulative holder.

11. The optical transceiver module as claimed in claim 10, wherein the converting pads are located above the printed circuit board.

12. The optical transceiver module as claimed in claim 11, wherein the whole second insulative holder is located above the printed circuit board.

13. The optical transceiver module as claimed in claim 12, wherein the optical fibers extend parallel to the printed circuit board.

14. The optical transceiver module as claimed in claim 13, wherein said first insulative holder and said second insulative holder are coupled to each other.

* * * * *